UNITED STATES PATENT OFFICE.

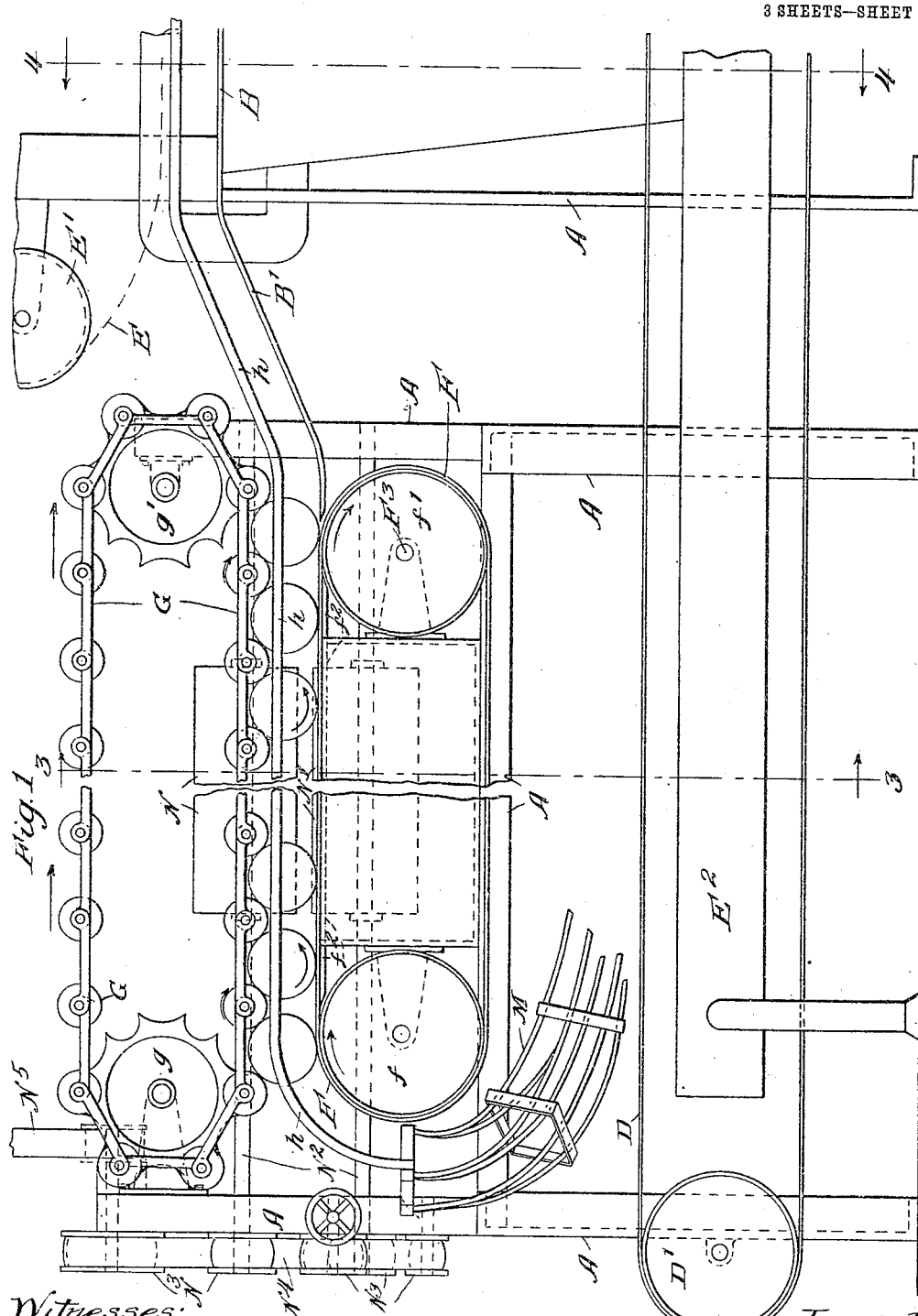

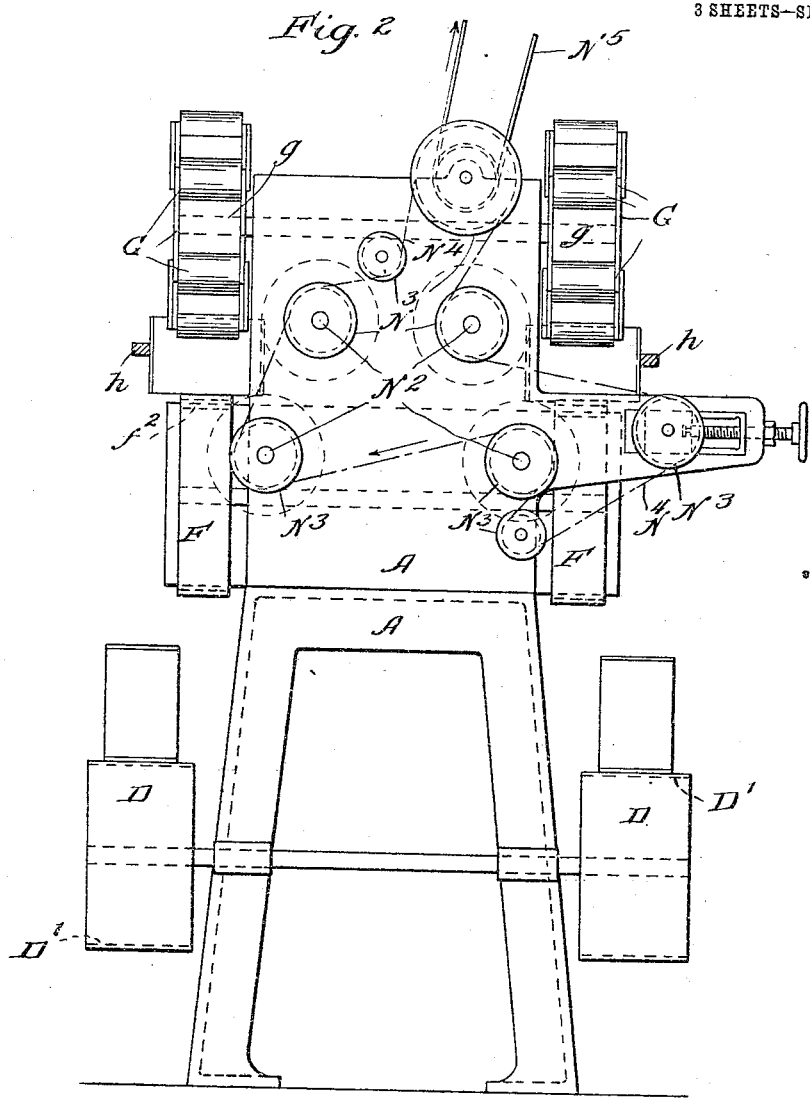

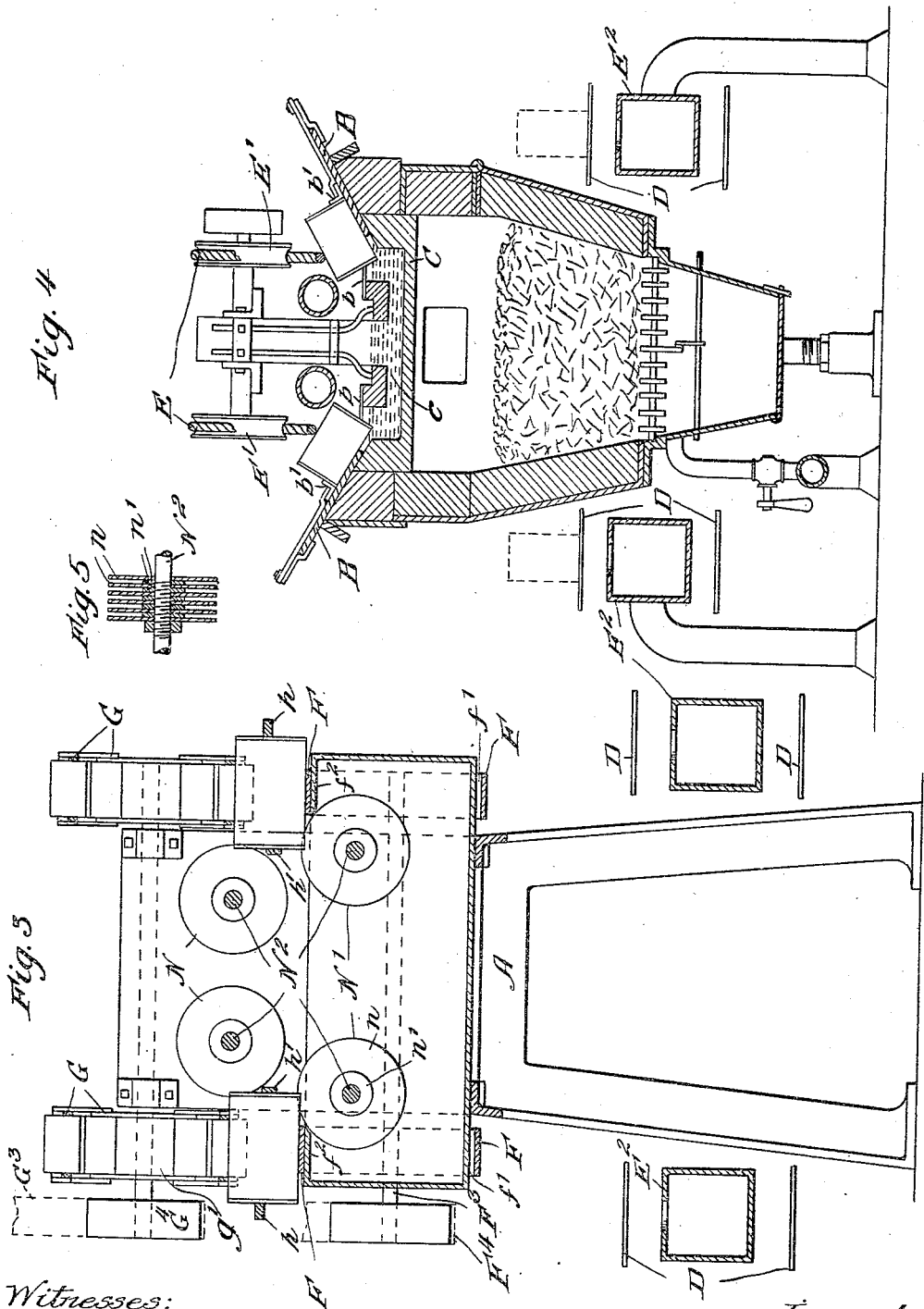

MEREDITH LEITCH, OF NEW YORK, N. Y., ASSIGNOR TO AMERICAN CAN COMPANY, OF NEW YORK, N. Y., A CORPORATION OF NEW JERSEY.

CAN-SOLDERING AND SURPLUS-SOLDER-REMOVING MACHINE.

958,750.     Specification of Letters Patent.     Patented May 24, 1910.

Application filed September 12, 1904. Serial No. 224,056.

*To all whom it may concern:*

Be it known that I, MEREDITH LEITCH, a citizen of the United States, residing in the borough of Brooklyn, in the county of Kings, city and State of New York, have invented a new and useful Improvement in Can-Soldering and Surplus-Solder-Removing Machines, of which the following is a specification.

My invention relates to machines for soldering the end seams of sheet metal cans and removing surplus solder therefrom.

My invention consists, in connection with a can end soldering machine, comprising a flux bath or device, a solder bath or device, runways for the cans extending over the flux and solder bath, endless conveyers or chains for rolling the cans along the runways, cooling belts for holding and conveying the cans in an upright position or with their end seams horizontal while the solder is cooling or setting, of rapidly rotating long, soft, cylindrical buffers along or in contact with which the cans may be conveyed and rotated with their corners or freshly soldered end seams in contact with the buffers, an endless flexible conveyer above the rolling cans and furnished with anti-friction rollers to engage and space or separate the cans one from another and convey the same along while permitting them to rotate each on its own axis, and a belt below the cans and upon which the cans rest, and traveling on a guide plate, and by which the cans are individually rotated on their axes as they are conveyed along by the upper conveyer in contact with the rotary buffers.

My invention also consists in the novel construction of parts and devices and in the novel combinations of parts and devices herein shown and described.

In the accompanying drawing, which forms a part of this specification, Figure 1 is a side elevation of a device or mechanism embodying my invention; Fig. 2 is an end view; Fig. 3 a vertical section on line 3—3 of Fig. 1; Fig. 4 is a vertical section on line 4—4 of Fig. 1, and Fig. 5 is a partial central longitudinal section of one of the rotary buffers.

In the drawing A represents the frame of the machine, B B are oppositely and transversely inclined soldering tracks or runways along which the cans are rolled, each having a lower guide $b$ and an upper adjustable guide $b^1$, C the solder bath or vessel, $c$ the molten solder therein, D D cooling belts traveling on horizontal pulleys $D^1$, E E endless conveyers or chains traveling on pulleys $E^1$ for rolling the cans along the runways B B, and $E^2$ $E^2$ compressed air trunks or conductors for aiding in cooling the cans as they are conveyed along by the cooling belts. All these parts are preferably of the kind or construction shown and described in the Hodgson and Taliaferro Patent No. 704,257 of July 8, 1902, to which reference is made for a full description thereof, the same being well known and familiar to those skilled in the art.

F F are lower endless can supporting conveyers or belts, one for each side of the machine, traveling on the pulleys $f$ $f^1$, the upper run of each belt having a guide plate $f^2$ extending between its pulleys to support the belt in a horizontal position.

G G are upper endless conveyers, one for each side of the machine, and each provided at intervals with anti-friction rollers adapted to engage and space or separate the cans and permit each can to rotate freely on its axis as it is being moved along by the conveyer G. Each of the conveyers G travels on sprocket wheels $g$ $g^1$, the space between the lower run of the conveyer G and the upper run of the belt F corresponding to the diameter or size of the cans, so that the cans will be rotated by the belt F as they are moved along by the conveyer G. Side guides $h$ $h^1$ bearing against the heads or ends of the cans guide the same as they are rotated and carried along by the conveyer. An inclined chute or runway $B^1$ delivers the cans from the soldering runway to the conveyer G. And a spirally twisted and curved or looped guide M serves to turn the cans from the horizontal position which they occupy while being moved along by the conveyer G into an upright position and to deliver the same in such upright position onto the cooling belt D.

N $N^1$ are rapidly rotating soft cylindrical buffers, each preferably about six inches in diameter and extending parallel to the path of the cans as they are moved along and rotated by the conveyer F and belt G, and adapted the one, N, to engage the flat or disk end surface of the freshly soldered seams of the rotating cans, as they are moved along by the conveyer G, and the other, N¹, to engage the cylindrical surface of the seam or of the can head flange and body as the cans are conveyed along and rotated. Each of the rotary buffers N N¹ is preferably some three or four feet in length, and each preferably composed of a series of thin, soft, flexible, circular textile disks n, preferably cotton cloth disks with interposed spacer disks or washers n¹ clamped together on the shaft N² of the buffers. The buffers are rotated at a slow buffing speed, as the freshly coated soldered surface to be buffed is in a substantially molten condition during the buffing and solder removing operation, the speed of the buffers being preferably about 600 revolutions per minute, although the speed may be varied as desired. Motion is communicated to the several buffer shafts N² by means of any suitable gearing, as for example by pulleys N³, connecting belt N⁴ and driving belt N⁵. Motion is communicated to the shaft F³ of the driving pulley of the belt F by a belt F⁴. And motion is communicated to the endless conveyer G by a driving belt G³ traveling on a pulley G⁴ on the shaft of the driving sprocket wheel g¹ of the conveyer G.

I claim:

1. In a can end soldering and surplus solder removing machine, the combination with a solder bath, transversely inclined soldering runways for the cans, means for rotating the cans along the soldering runways, cooling belts, endless can supporting and rotating conveyers or belts, guide plates for the upper runs of said can supporting belts, parallel endless conveyers above said can supporting belts having anti-friction rollers to engage and space or separate the cans, rotary cylindrical buffers extending parallel to said can supporting belts and engaging the corner solder-coated surfaces of the cans, inclined runways for delivering the cans to the can supporting belts and conveyers, and curved or twisted guides for turning the cans into an upright position and delivering them onto the cooling belts, substantially as specified.

2. In a can end soldering and surplus solder removing machine, the combination with a solder bath, of a soldering runway for the cans, means for rolling the cans along the soldering runway, a cooling belt, an endless can supporting conveyer or belt, a guide plate for the upper run thereof, an endless conveyer above said can supporting belt having anti-friction rollers to engage and space or separate the cans, rotary cylindrical buffers extending parallel to said can supporting belt and engaging the solder-coated corner surfaces of the cans, an inclined runway for delivering the cans from the soldering runway to the can supporting belt, and a curved or twisted guide for turning the cans into an upright position and delivering them onto the cooling belt, substantially as specified.

3. In a can end soldering and surplus solder removing machine, the combination with a solder bath, transversely inclined soldering runways for the cans, means for rotating the cans along the soldering runways, cooling belts, endless can supporting and rotating conveyers or belts, guide plates for the upper runs of said can supporting belts, parallel endless conveyers above said can supporting belts to engage and space or separate the cans, rotary cylindrical buffers extending parallel to said can supporting belts and engaging the corner solder coated surfaces of the cans, inclined runways for delivering the cans to the can supporting belts and conveyers, and curved or twisted guides for turning the cans into an upright position and delivering them onto the cooling belts, substantially as specified.

4. In a can end soldering and surplus solder removing machine, the combination with a solder bath, of a soldering runway for the cans, means for rolling the cans along the soldering runway, a cooling belt, an endless can supporting conveyer or belt, a guide plate for the upper run thereof, an endless conveyer above said can supporting belt to engage and space or separate the cans, rotary cylindrical buffers extending parallel to said can supporting belt and engaging the solder coated corner surfaces of the cans, an inclined runway for delivering the cans from the soldering runway to the can supporting belt, and a curved or twisted guide for turning the cans in an upright position and delivering them onto the cooling belt, substantially as specified.

MEREDITH LEITCH.

Witnesses:
  W. F. DUTTON,
  A. R. GIBBS.